United States Patent
McNaughton

(10) Patent No.: US 6,716,266 B2
(45) Date of Patent: Apr. 6, 2004

(54) DUST FILTER

(75) Inventor: Craig Douglas McNaughton, Cheltenham (AU)

(73) Assignee: Russell Dean Potts, Dolls Point (AU)

( * ) Notice: Subject to any disclaimer, the term of this patent is extended or adjusted under 35 U.S.C. 154(b) by 0 days.

(21) Appl. No.: 09/949,355

(22) Filed: Sep. 7, 2001

(65) Prior Publication Data

US 2002/0026776 A1 Mar. 7, 2002

(30) Foreign Application Priority Data

Sep. 7, 2000 (AU) .............................................. 56541/00

(51) Int. Cl.$^7$ .......................... B01D 46/10; B01D 29/05
(52) U.S. Cl. .............................. 55/495; 55/501; 55/502; 55/507; 55/509; 55/528; 55/DIG. 31; 96/417
(58) Field of Search ......................... 55/495, 501, 502, 55/505, 507, 509, 528, DIG. 31; 96/417

(56) References Cited

U.S. PATENT DOCUMENTS

| | | | |
|---|---|---|---|
| 1,739,372 A | | 10/1929 | Pirchio |
| 2,252,724 A | * | 8/1941 | Myers .......................... 55/502 |
| 3,635,001 A | * | 1/1972 | Komroff et al. ............... 96/417 |
| 3,869,392 A | * | 3/1975 | Wolf ............................ 55/502 |
| 4,277,267 A | | 7/1981 | Posner et al. |
| 4,356,791 A | | 11/1982 | Ward et al. |
| 4,854,953 A | | 8/1989 | Van Weeden et al. |
| 5,240,487 A | | 8/1993 | Kung |
| 5,472,380 A | | 12/1995 | Sarazen, Jr. et al. |
| 5,707,411 A | | 1/1998 | Rodaway et al. |
| 5,776,218 A | | 7/1998 | Enns |
| 5,800,588 A | * | 9/1998 | Miller .................... 55/DIG. 31 |
| 5,902,361 A | * | 5/1999 | Pomplun et al. ............... 55/502 |
| 6,045,598 A | * | 4/2000 | Fath et al. ..................... 55/502 |
| 6,162,272 A | * | 12/2000 | Michaelis et al. ............. 55/502 |
| 6,183,526 B1 | * | 2/2001 | Suzuki ....................... 55/385.3 |
| 6,200,465 B1 | * | 3/2001 | Carawan et al. .............. 55/502 |
| 6,203,592 B1 | * | 3/2001 | Carawan ................ 55/DIG. 31 |
| 6,267,796 B1 | * | 7/2001 | Schottmer ..................... 55/502 |
| 6,406,509 B1 | * | 6/2002 | Duffy ........................... 55/502 |
| 6,454,826 B2 | * | 9/2002 | Fath et al. ..................... 55/502 |

FOREIGN PATENT DOCUMENTS

| | | |
|---|---|---|
| AU | 85538/82 | 7/1982 |
| AU | 40957/96 | 7/1996 |
| CA | 2168085 | 1/1996 |
| WO | 97/40919 | 11/1997 |
| WO | 99/02926 | 1/1999 |
| WO | 99/02927 | 1/1999 |

* cited by examiner

Primary Examiner—Duane Smith
Assistant Examiner—Jason M. Greene
(74) Attorney, Agent, or Firm—Volpe and Koenig, P.C.

(57) ABSTRACT

A dust filter for a ducted air delivery system has a frame, a filter, an extension of rubbery thermoplastic material, and an integral lip. The frame defines an open mouth and a body portion formed of rubbery thermoplastics material reinforced with one or more stiffening elements. The filter material extends from sides of the frame to cover the open mouth. The intermediate extension of rubbery thermoplastic material extends outwardly from a joint with the body portion. The integral lip of flexible resilient material is joined to the intermediate extension. The lip of flexible resilient material is shaped to make a friction fit within the outlet of a duct to hold the dust filter therein.

32 Claims, 1 Drawing Sheet

DUST FILTER

FIELD OF THE INVENTION

The invention relates to a dust filter for a ducted air delivery system and relates particularly but not exclusively to dust filters suitable for fitting into the plenum of air ducts.

BACKGROUND OF THE INVENTION

Air conditioning and air heating systems for homes and offices commonly include a number of ducts for delivery of the heated or cooled air, the ducts terminating in outlets spaced at various locations around the home or office with the spacing being chosen to give an even distribution of heating and/or cooling over the area concerned. Typically, the outlet of such ducts is in the form of a plenum which is covered by an exhaust air register.

Over time, dust can collect in the ducting system or it can be recirculated through the ducting system by the heating or cooling unit. Such dust which includes particulates such as moulds, pollens and the like will cause a build up of dust in the area immediately surrounding the registers. Furthermore, the airborne dust circulated by the system can affect the health of susceptible individuals, particularly those affected by respiratory problems such as asthma.

To overcome this difficulty, various types of filter constructions have been proposed. However they all suffer from various disadvantages. For example, they may be relatively complex, making them expensive to manufacture, difficult to install and difficult to remove for cleaning.

Thus there is a need for a dust filter construction which can be readily installed and is of such simple construction that it can be manufactured at reasonable cost.

DISCLOSURE OF THE INVENTION

The invention provides a dust filter for a ducted air delivery system comprising, a frame defining an open mouth, the frame having a body portion formed of rubbery thermoplastics material reinforced with one or more stiffening elements, a filter material extending from the sides of the frame to cover the open mouth, and an integral lip of flexible resilient material extending outwardly from the body portion, the integral lip being less than half the thickness of the body portion over most of its extent, wherein the lip of flexible resilient material is shaped so that it may make a friction fit within the outlet of a duct to hold the dust filter therein.

Typically, the dust filter is shaped so that it fits snugly in the plenum forming part of the outlet. The plenum forms a friction fit therewith and may be covered by a conventional exhaust register.

Suitably, the dust filter may include means to facilitate manual gripping of the filter so that it may be conveniently removed from the plenum after it has had a certain amount of use. Such gripping means may comprise one or more handles provided on the frame. Such one or more handles may be in the form of an integrally formed post extending upwardly from the frame. Alternatively the gripping means may comprise a plurality of integral tabs extending from the lip.

In order to assist with the friction fit characteristics of the filter, it is preferred that the lip extends laterally from the frame.

The lip may take any suitable shape; for example it may be straight, curved or V-shape. It may be dimensioned so that pushing the dust filter downwards into a plenum has the effect of bending the lip to push the edges of the lip upwards. In this way, the edges of the lip will press against the sides of the plenum chamber and will resist upwards pressure on the dust filter, by air flowing upwardly therethrough, to retain the filter in the plenum.

Suitably, the frame of the dust filter includes a body portion which is moulded from a rubbery thermoplastics material such as natural rubber, polyurethane or silicone rubber. However silicone rubber is particularly preferred.

In order to strengthen the frame which comprises rubbery material, the one or more stiffening elements may be retained in a recess or recesses formed in the body portion of the frame.

In a particularly preferred aspect of the invention, a stiffening element formed in one piece which extends around the body of the frame may be provided. With such an arrangement, it is preferred that the thermoplastic material comprising the body portion be moulded directly onto the frame thereby securing the stiffening element within the frame.

The stiffening element itself may be formed of any material which can lend stiffness to the frame. For example the stiffening element may comprise a square or rectangular member made of metal or hard plastic. The dimensions of the member may be slightly smaller than the dimensions of a rectangular or square plenum in which the dust filter is to be retained.

In one form of the invention, the filter material and the thermoplastic material comprising the frame may be heat welded together. Alternatively, the filter material may be friction fitted into the recess for holding the one or more stiffening elements in association with such stiffening elements.

In another form of the invention, the filter material may be bonded to an integrally formed internal ledge extending from a body portion of the frame around the open mouth.

The dust filter itself may comprise a plurality of fibres. It may comprise a batt of non-woven fibres. Examples of suitable fibres include polyester, fibreglass, wool, cotton, arylamides or arylimides.

An indicator may be provided on the dust filter. The indicator may be adapted to indicate that the dust filter needs replacement or cleaning. It may be a time based indicator ie. it automatically indicates when a period has expired after manufacture of the dust filter. For this purpose, it may be a form of chemically active printing which changes color or indicates in some other way that the filter has reached an age at which it should be replaced. It may be invisible when the filter is first manufactured and may become visible under time with a message to indicate that the filter needs replacement or cleaning. For example the word "expired" or the words "replace me" may become visible over time.

Alternatively, the indicator may include a physical or chemical treatment which is based upon the amount of use the filter has received. For example, the bat of fibres comprising the filter element may include regions where the density of fibres is deliberately increased eg. they may be compressed. As the regions of greater density will have a reduced air flow therethrough, they will tend to pick up less dust. Over time, the dust pick up on the remainder of the filter will be clearly visible compared with the regions of higher density. Thus if the regions of higher density are formed as words, over time, the dust collected by the filter will make these words more visible hence giving an indication to the user that the filter needs to be cleaned or replaced.

Preferred aspects will now be described with reference to the accompanying drawings.

Figure 1:
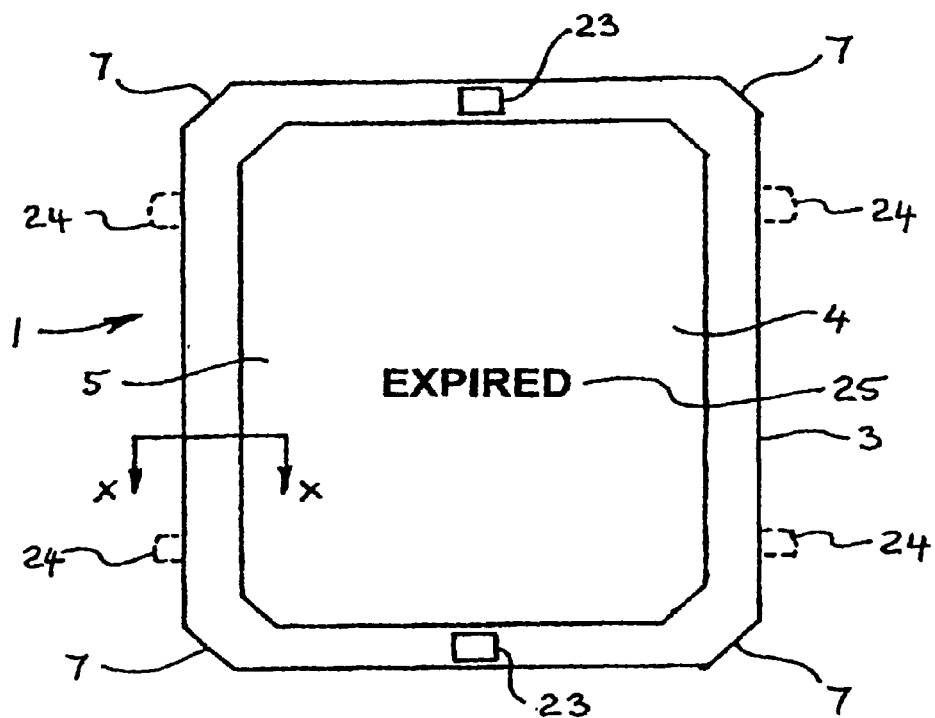
FIG. 1 is a plan view of a dust filter in accordance with the invention.

The various integers which will be described with reference to the accompanying drawings are identified in the following list.
1 dust filter
3 frame
4 open mouth
5 filter material
7 corner cut off
9 extended lip
11 ramp portion
13 body
15 recess
17 internal ledge
19 stiffener
21 filter element extension
23 handle element
24 tab
25 indicator
30 dust filter
31 frame
32 V-lip
34 body
36 recess
38 stiffener
40 filter material

DETAILED DESCRIPTION OF THE PREFERRED EMBODIMENTS

Figure 2:
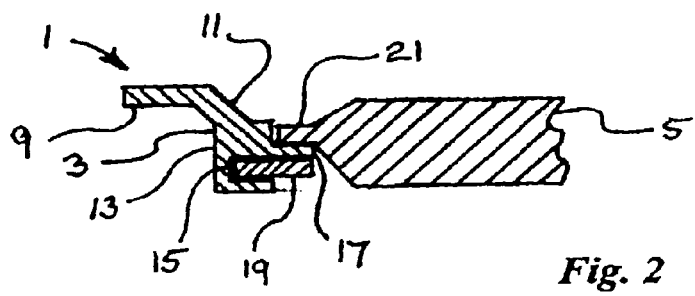
FIG. 2 shows a fragmentary view of the section X—X taken through FIG. 1.

Referring to FIGS. 1 and 2 of the accompanying drawings there is shown a dust filter generally designated 1 having a frame 3 defining the external perimeter of the dust filter. The frame which may be square or rectangular defines an open mouth 4 which is covered by a filter material 5.

The corners 7 of the frame are cut off as illustrated in order to assist with placement of the dust filter into an outlet plenum.

The frame includes a thick body portion 13 integrally formed with a thin extended lip 9 joined to the body portion by the ramp portion 11. The "thinness" of the lip assists it to bend to conform to the shape of the plenum. The cut off corners allow the lip to flex without undue "crinkling" at the corners. It can be seen that the thickness of the lip is substantially less than that of the thick body portion. Typically it will be less than 50% or even 30% of the body portion.

A recess 15 is formed in the body portion. It is shaped to receive the stiffener 19 which may be a metal strip friction fitted in the recess. There may be a separate metal strip for each side of the body portion. Alternatively there may be a single rectangular or square metal strip around which the body portion is moulded.

An internal ledge 17 defining one of the sides of the recess is arranged so that the filter element extension 21 can sit on top of the internal ledge and be bonded thereto. Such bonding may be achieved by heat welding, mechanical fasteners or adhesives.

Handle elements 23 in the form of members provided on opposite sides of the frame extending upwardly of the frame are provided to assist a user who wishes to remove the frame from a plenum once the filter has become clogged.

Such handles may take any suitable shape. For example they may be in the form a T or an upstanding post with a circular ring mounted thereon. As an alternative to the handle elements 23, integral tabs 24 shown in dotted lines extending from the lip may be included instead. An advantage of the integral tabs is that they project upwardly as the dust filter is pushed downwardly into a plenum.

The filter material 5 is provided with an indicator 25 to shown when the filter needs to be replaced. In this example, the indicator may comprise a chemical element which displays the word "expired" after a predetermined period of use. The chemical indicator may be susceptible to any physical features associated with the flow of air through the filter such as the temperature of the air or the velocity of the air.

It can be seen that the filter described with reference to FIGS. 1 and 2 can be push fitted into an outlet plenum. In doing so the lip 9 flexes upwardly to hold the filter in the plenum by friction whilst at the same time sealing the edges of the filter against the plenum walls.

Figure 3:
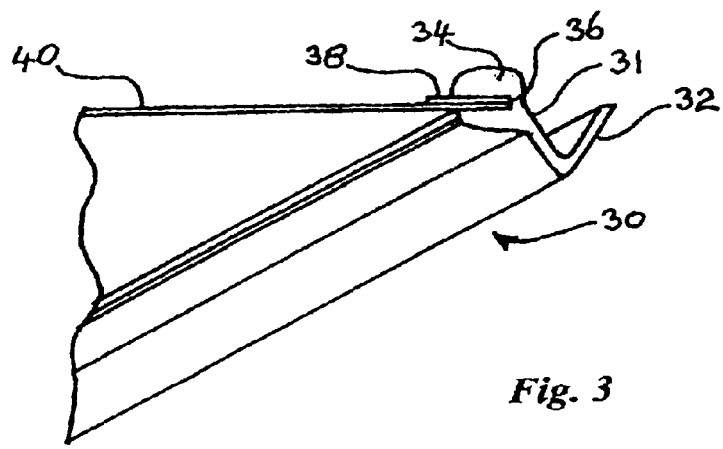
FIG. 3 shows a fragmentary section of an alternative dust filter construction in accordance with the invention.

Referring to FIG. 3, the dust filter section 30 differs from that shown with reference to FIGS. 1 and 2 in that the frame 31 is provided with an integral V-lip 32.

The body portion 34 of the frame includes a recess 36 extending around the perimeter of the opening defined by the frame. The recess is arranged so that a stiffener 38 and filter material 40 may be friction fitted together in the recess in the manner illustrated. Alternatively, the stiffener and filter material may be retained in the recess by mechanical or chemical bonding. In another alternative the material forming the body portion may be moulded over the stiffener and filter material which will be positioned in a mould.

It is to be understood that the word comprising as used throughout the specification is to be interpreted in its inclusive form ie. use of the word comprising does not exclude the addition of other elements.

It is to be understood that various modifications of and/or additions to the invention can be made without departing from the basic nature of the invention. These modifications and/or additions are therefore considered to fall within the scope of the invention.

What is claimed is:

1. A dust filter for a ducted air delivery system comprising, a frame defining an open mouth, the frame having a body portion formed of rubbery thermoplastics material reinforced with one or more stiffening elements, a filter material extending from the-sides of the frame to cover the open mouth, an intermediate extension of rubbery thermoplastic material extending outwardly from a join with the body portion, and an integral lip of flexible resilient material joined to the intermediate extension at a location outwardly displaced from the join with the body portion the integral lip extending outwardly from the body portion in a different direction to the intermediate extension so that it makes an angle with the intermediate extension, the integral lip being less than half the thickness of the body portion over at least half of its extent, wherein the lip of flexible resilient material is shaped so that it may make a friction fit within the outlet of a duct to hold the dust filter therein, and upper and lower layers of the rubbery thermoplastic material extend above and below the one or more stiffening elements to form a four layer composite comprising the under and lower layers of rubbery thermoplastics material, the stiffening elements and a peripheral edge of the filter material.

2. A dust filter according to claim 1 wherein the one or more stiffening elements are retained in one or more recesses formed in the body portion and the intermediate extension extends outwardly from the join with the body portion at an angle to a plane defining the open mouth.

3. A dust filter according to claim 1 wherein the dust filter is square or rectangular with cut off corners.

4. A dust filter according to claim 1 including a plurality of integrally moulded tabs extending from an outer edge of the integral lip.

5. A dust filter according to claim 1 having a unitary stiffening element which extends around the frame and the body portion has been moulded directly onto the stiffening element which is retained therein.

6. A dust filter according to claim 1 wherein the filter material and frame are heat welded together.

7. A dust filter according to claim 1 wherein the filter material is bonded to an integrally formed internal ledge extending from a body portion of the frame around the open mouth.

8. A dust filter according to claim 1 wherein the intermediate extension and lip together form a V-shape.

9. A dust filter according to claim 1 wherein the filter material comprises a batt of non-woven fibres.

10. A dust filter according to claim 9 wherein the fibres are comprised of polyester, fibreglass, wool, cotton arylamides or arylimides.

11. A dust filter according to claim 1 including an indicator which is adapted to indicate that the filter requires replacement or has expired after a predetermined time or amount of use or that the filter is blocked by dust.

12. A dust filter according to claim 1 wherein the frame comprises a body portion provided with a recess and the filter material is retained in the recess in abutment with one or more stiffening elements also retained in the recess.

13. A dust filter according to claim 1 wherein the lip extends laterally with respect to the frame and is joined to the body portion by an intermediate extension which extends outwardly and upwardly away from the frame.

14. A dust filter according to claim 2 wherein the filter material and frame are heat welded together.

15. A dust filter according to claim 2 wherein the frame comprises a body portion provided with a recess and the filter material is retained in the recess in abutment with one or more stiffening elements also retained in the recess.

16. A dust filter according to claim 3 wherein the frame comprises a body portion provided with a recess and the filter material is retained in the recess in abutment with one or more stiffening elements also retained in the recess.

17. A dust filter according to claim 4 wherein the frame comprises a body portion provided with a recess and the filter material is retained in the recess in abutment with one or more stiffening elements also retained in the recess.

18. A dust filter according to claim 5 wherein the frame comprises a body portion provided with a recess and the filter material is retained in the recess in abutment with one or more stiffening elements also retained in the recess.

19. A dust filter according to claim 8 wherein the frame comprises a body portion provided with a recess and the filter material is retained in the recess in abutment with one or more stiffening elements also retained in the recess.

20. A dust filter according to claim 9 wherein the frame comprises a body portion provided with a recess and the filter material is retained in the recess in abutment with one or more stiffening elements also retained in the recess.

21. A dust filter according to claim 10 wherein the frame comprises a body portion provided with a recess and the filter material is retained in the recess in abutment with one or more stiffening elements also retained in the recess.

22. A dust filter according to claim 11 wherein the frame comprises a body portion provided with a recess and the filter material is retained in the recess in abutment with one or more stiffening elements also retained in the recess.

23. A dust filter according to claim 3 wherein the lip extends laterally with respect to the frame and is joined to the body portion by an intermediate extension which extends outwardly and upwardly away from the frame.

24. A dust filter according to claim 4 wherein the lip extends laterally with respect to the frame and is joined to the body portion by an intermediate extension which extends outwardly and upwardly away from the frame.

25. A dust filter according to claim 5 wherein the lip extends laterally with respect to the frame and is joined to the body portion by an intermediate extension which extends outwardly and upwardly away from the frame.

26. A dust filter according to claim 7 wherein the lip extends laterally with respect to the frame and is joined to the body portion an intermediate extension which extends outwardly and upwardly away from the frame.

27. A dust filter according to claim 8 wherein the lip extends laterally with respect to the frame and is joined to the body portion by an intermediate extension which extends outwardly and upwardly away from the frame.

28. A dust filter according to claim 9 wherein the lip extends laterally with respect to the frame and is joined to the body portion by an intermediate extension which extends outwardly and upwardly away from the frame.

29. A dust filter according to claim 10 wherein the lip extends laterally with respect to the frame and is joined to the body portion by an intermediate extension which extends outwardly and upwardly away from the frame.

30. A dust filter according to claim 11 wherein the lip extends laterally with respect to the frame and is joined to the body portion by an intermediate extension which extends outwardly and upwardly away from the frame.

31. A dust filter according to claim 11 wherein the lip extends laterally with respect to the frame and is joined to the body portion by a ramp portion.

32. A dust filter according to claim 2 wherein the lip extends laterally with respect to the frame and is joined to the body portion by an intermediate extension which extends outwardly and upwardly away from the frame.

* * * * *

UNITED STATES PATENT AND TRADEMARK OFFICE
CERTIFICATE OF CORRECTION

PATENT NO. : 6,716,266 B2
DATED : April 6, 2004
INVENTOR(S) : McNaughton et al.

It is certified that error appears in the above-identified patent and that said Letters Patent is hereby corrected as shown below:

Column 4,
Line 54, delete "the-sides", and insert therefor -- sides --.

Column 5,
Line 72, delete "the under", insert therefor -- the upper --.

Column 6,
Line 34, delete "portion an", and insert therefor -- portion by an --.

Signed and Sealed this

Sixth Day of September, 2005

JON W. DUDAS
*Director of the United States Patent and Trademark Office*